Sept. 13, 1955 D. H. BOWLZER 2,717,757
VALVE MEANS
Filed April 7, 1950
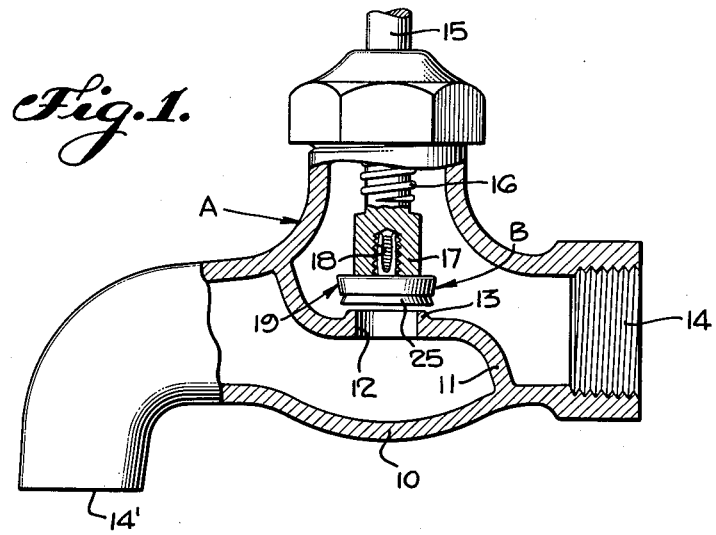
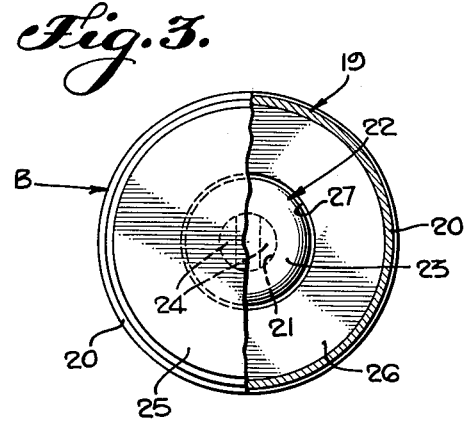
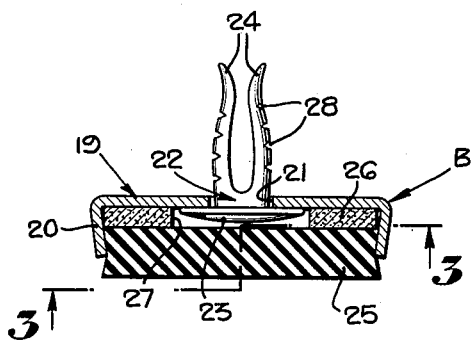
DANIEL H. BOWLZER,
INVENTOR.
BY 
ATTORNEY

United States Patent Office 2,717,757
Patented Sept. 13, 1955

2,717,757

VALVE MEANS

Daniel H. Bowlzer, Los Angeles, Calif., assignor to Kirkhill Inc., Downey, Calif., a corporation of California Application April 7, 1950, Serial No. 154,557

1 Claim. (Cl. 251—86)

The present invention relates generally to valve means, and is more particularly concerned with an improved valve washer which may be utilized in the conventional type of valve or faucet.

One object of the herein described invention is to provide an improved valve means embodying a swivelly mounted valve washer of simple and inexpensive construction, containing novel mounting means for frictionally retaining the washer in operative position on a valve stem, and which is so arranged that pressure of the valve washer against an associated valve seat will not act to bind or interfere with the swivel mounting.

Another object is to provide as an article of manufacture, a replacement valve washer assembly which may be utilized in place of the usual type of valve washer that is fixedly secured to the valve actuating stem, and when utilized as a replacement will provide a swivelly mounted washer permitting relative rotative movement between the washer and stem when the washer engages with an associated valve seat. The present washer assembly is advantageous in that it prolongs the life of valve washers so that leaks will not develop as rapidly and waste valuable water. Moreover, the washer assembly is so arranged that it may be easily mounted on the operative stem of the valve or faucet.

Further objects of the invention will be brought out in the following part of the specification, wherein detailed description is for the purpose of fully disclosing the invention without placing limitations on the scope thereof.

Referring to the drawings, which are for illustrative purposes only:

Fig. 1 is an elevational view of a faucet having cutaway portions showing sectioned parts of the faucet and the manner in which the present invention is embodied therein;

Fig. 2 is an enlarged diametrical section through a valve washer assembly embodying the features of the herein described invention; and Fig. 3 is a transverse sectional view of the same, taken substantially on line 3—3 of Fig. 2.

Referring now to the drawings, there is represented in Fig. 1 a faucet of conventional construction, as generally indicated at A.

Faucet A comprises a hollow body 10 having a partition 11 therein, containing a flow opening 12 arranged at its periphery to provide an annular valve seat 13 in the flow path from an inlet 14 to an outlet 14' of the faucet.

The faucet is provided with a conventional actuating stem 15 having the usual threads 16 which operate to raise and lower the innermost end 17 of the stem with respect to the seat 13, upon rotative movement of the stem 15 in opposite directions. The end 17 of the stem is provided with a threaded end opening 18 which ordinarily receives a securing screw (not shown), by means of which the ordinary valve washer is secured to the inner end of the actuating stem.

In this type of mounting, the valve washer is fixedly secured to the stem end 17 for rotative movements therewith, and it is not possible for the valve washer to rotate independently or swivel on the valve stem. As a consequence, in the ordinary arrangement the rotation of the valve washer surface on the valve seat 13 during closing operations acts to wear out and damage the washer surface within a relatively short time, so that leaky faucets result and the washer must be replaced at frequent intervals.

In the present invention, a valve washer assembly B is provided which is arranged to permit relative swivel movement between the valve washer and the stem during seating and opening movements of the valve.

More specifically, the valve washer assembly B, as shown in Fig. 2, comprises an inverted cupped member 19 of circular shape having a deflected peripheral flange 20. The cupped member is provided with a central opening 21 adapted to receive a pivot member 22, in this instance a bifurcated rivet having a head 23 positioned within the cupped member 19 and projecting legs 24—24.

The cupped member provides a seat for a valve disc 25 secured in the open end of the cupped member. This valve disc may be of any suitable material such as leather, rubber, or other material adapted for the required purpose.

In order to prevent the pressure of the valve disc 25 against the seat 13 from pressing against the head 23 of the pivot member, which would prevent pivotal or swivel movement, when the valve disc 25 is seated against the valve seat 13, a spacer washer 26 is provided. This washer may be made of any suitable material, and in the present instance I have utilized a fibrous material for its construction. The washer is of annular shape and of such size as to fit snugly within the flange 20 against the bottom of the cupped member 19 when interposed between the valve disc and the bottom of the cupped member. The washer has a central opening 27 adapted to surround and receive therein the head 23 of the pivot member. Also, the washer 26 is slightly thicker than the thickness of the head 23, so that the inner surface of the valve disc 25 adjacent the head 23 will be supported out of contact and provide clearance within which the swivel or rotation about the pivot head may be accomplished.

In order to mount the valve washer assembly on the end 17 of the actuating stem 15, it is only necessary to insert the legs 24 into the threaded end opening 18, pressing the assembly toward the end 17 until the bottom of the cupped member 19 is in substantially surface engagement with the end surface of the stem end 17. The legs 24 operate to frictionally hold the assembly in operative position and permit the valve washer assembly to rotate as previously explained. The holding action of the legs 24—24 against the threads is augmented by spaced notches or grooves 28 on the outer surface of the legs, which are adapted to grippingly receive the associated thread edges therein.

I claim:

As an article of manufacture, a replacement valve washer assembly adapted for attachment to a valve stem having an end opening therein, and comprising: a cupped member having a substantially flat bottom portion adapted to uniformly engage the end surface of the valve stem, and a central opening therein; a bifurcate rivet having a head and deformable legs, said rivet being positioned with its head within said cupped member and its legs extending through said central opening and adapted for insertion endwise into an anchoring position within the end opening of the valve stem; a valve disc seated in the cupped member and having an outer surface portion adapted to operatively engage an annular seat member; and an annular washer of substantially rigid material surrounding said head with opposite faces respectively engaging the adjacent flat bottom portion of the cupped member and the adjacent surface of the valve disc, said washer having a central opening of larger diameter than said head and being of greater thickness than said head to provide clearance between said head and adjacent surfaces of said flat bottom portion, said valve disc, and said washer, so as to permit unimpeded relative swivel movements of the parts on said rivet, and said washer having its outer peripheral edge substantially coincident with the outer peripheral edge of the valve disc, and its inner edge adjacent the peripheral edge of said head, so as to uniformly and substantially non-resiliently back-up the said disc opposite its outer seat engaging surface portion and transmit seating forces to the end of the valve stem through said washer and the bottom of said cupped member.

References Cited in the file of this patent

UNITED STATES PATENTS

| | | |
|---|---|---|
| 1,844,399 | Kiley | Feb. 9, 1932 |
| 2,008,101 | Haury | July 16, 1935 |
| 2,271,391 | Drake | Jan. 27, 1942 |
| 2,443,012 | Pope | June 8, 1948 |

FOREIGN PATENTS

| | | |
|---|---|---|
| 536,897 | Great Britain | May 30, 1941 |